United States Patent
Xing et al.

(10) Patent No.: US 10,955,738 B2
(45) Date of Patent: Mar. 23, 2021

(54) HOLOGRAPHIC PHOTOGRAPHING SYSTEM, HOLOGRAPHIC DISPLAY SYSTEM, STEREOSCOPIC PHOTOGRAPHING SYSTEM, AND DISPLAY METHOD

(71) Applicant: Tianyi Xing, Tianjin (CN)

(72) Inventors: Tianyi Xing, Tianjin (CN); Yu Xing, Tianjin (CN)

(73) Assignee: TIANJIN CRDT FLUID CONTROL SYSTEM LTD., Tianjin (CN)

( * ) Notice: Subject to any disclaimer, the term of this patent is extended or adjusted under 35 U.S.C. 154(b) by 5 days.

(21) Appl. No.: 16/485,461

(22) PCT Filed: Feb. 13, 2018

(86) PCT No.: PCT/CN2018/076648
§ 371 (c)(1),
(2) Date: Aug. 13, 2019

(87) PCT Pub. No.: WO2018/149392
PCT Pub. Date: Aug. 23, 2018

(65) Prior Publication Data
US 2019/0361334 A1    Nov. 28, 2019

(30) Foreign Application Priority Data

Feb. 15, 2017   (CN) .......................... 201710079692.7
Feb. 15, 2017   (CN) .......................... 201710082499.9
Feb. 28, 2017   (CN) .......................... 201710116751.3

(51) Int. Cl.
*G03B 35/08* (2021.01)
*G02B 30/26* (2020.01)
(Continued)

(52) U.S. Cl.
CPC ............ *G03B 35/08* (2013.01); *G01B 11/005* (2013.01); *G02B 30/26* (2020.01); *G03B 17/12* (2013.01);
(Continued)

(58) Field of Classification Search
USPC ........................................................ 396/325
See application file for complete search history.

(56) References Cited

U.S. PATENT DOCUMENTS

2020/0004131 A1* 1/2020 Xing ..................... H04N 5/225

* cited by examiner

*Primary Examiner* — Rodney E Fuller
(74) *Attorney, Agent, or Firm* — George G. Wang; Bei & Ocean (57) ABSTRACT

A holographic photographing system, a holographic display system, a stereoscopic photographing system and a display method are provided. M photographing devices are distributed on a same circumference at equal intervals, and an included angle between two adjacent photographing devices to a center of circle is 360/m. At a top end of a vertical portion of an L-shaped frame, each of the photographing devices is at equal intervals provided with: an intermediate photographing mechanism, a left photographing mechanism and a right photographing mechanism, a left driving servo motor and a right driving servo motor, a guide post and a vertical driving servo motor, and a driving lead screw connected to a driving shaft. The support plate moves up and down along the guide post to drive the left driving mechanism and the right driving mechanism to move up and down.

9 Claims, 6 Drawing Sheets

(51) Int. Cl.
*G06T 7/55* (2017.01)
*G06T 7/521* (2017.01)
*G06T 7/70* (2017.01)
*G01B 11/00* (2006.01)
*H04N 5/247* (2006.01)
*G03B 17/12* (2021.01)
*G03B 17/42* (2021.01)
*H04N 5/225* (2006.01)

(52) U.S. Cl.
CPC ............ *G03B 17/425* (2013.01); *G06T 7/521* (2017.01); *G06T 7/55* (2017.01); *G06T 7/70* (2017.01); *H04N 5/2253* (2013.01); *H04N 5/2254* (2013.01); *H04N 5/247* (2013.01)

ID OF THE INVENTION

The present invention relates to an image photographing and playing system, and in particular to a holographic photographing system, a holographic display system, a stereoscopic photographing system and a display method.

BACKGROUND OF THE INVENTION

The technology for photographing 3D movies and playing 3D movies is to shoot a real 3D scene in a 3D method and then play and show the shot 3D scene to everyone in a 3D method.

Figure 1:
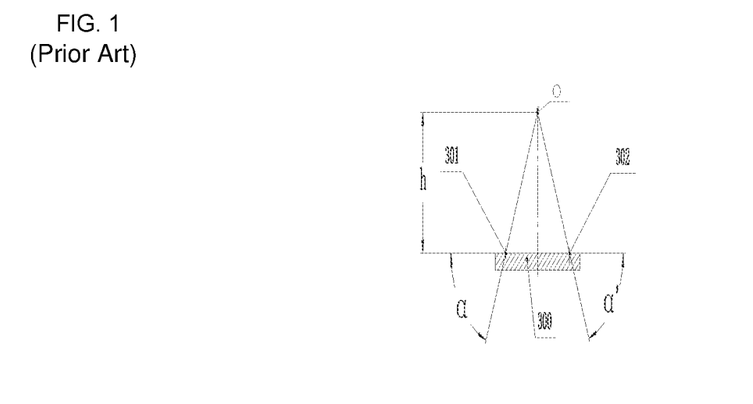
FIG. 1 is a schematic diagram of photographing 3D images in the prior art.

As the most widely used prior art at present, as shown in FIG. 1, two cameras, i.e., a left camera 301 and a right camera 302, are arranged in parallel at a distance of 63 mm (the distance between human eyes), and are biased inward at a small angle of a and a', respectively. The intersection '0' of the center lines of the lenses of the two cameras is positioned on a surface of an object to be photographed. Before photographing, an X-direction polarized lens or a red lens is mounted on the lens of the left camera 301, and a Y-direction polarized lens or a green lens is mounted on the lens of the right camera 302; and, the two cameras are simultaneously started for photographing. During displaying, the two images are simultaneously displayed on the screen. At this time, if the movie is watched by naked eyes, it is very blurry and there are ghost images, a special glasses is required when watching the movie. If the images are shot by the polarized light, it is necessary to wear a pair of polarized glasses. Since an X-direction polarized lens is worn on the left eye, only the images shot by the left camera 301 can be seen, but the images shot by the right camera 302 cannot be seen; and, since a Y-direction polarized lens is worn on the right eye, only the pictures shot by the right camera 302 can be seen, but the images shot by the left camera 301 cannot be seen. If the images are shot by red and green light, it is necessary to wear a pair of red-green glasses when watching. Since a green lens is worn on the left eye, only the red images shot by the left camera 301 can be seen, but the green images shot by the right camera 302 cannot be seen; and, since a red lens is worn on the right eye, only the green images shot by the right camera 302 can be seen, but the red images shot by the right camera 301 cannot be seen. When a viewer faces the screen, the images viewed in this way are really like stereoscopic images simultaneously viewed by two eyes. This is the 3D movie watched.

In the prior art, it is necessary to wear a pair of 3D glasses when watching the 3D movie. The images watched by the viewer are image illusions photographed at two positions, which will cause dizziness and nausea after the long-time watching.

Additionally, there are still some disadvantages: the photographing and displaying in the prior art can only be performed from a single angle of view, and it is impossible to simultaneously view scenes of a same moving object from other angles of view, such as watching side and back of a same moving object simultaneously, so it is impossible to fully satisfy the taste of all viewers.

SUMMARY OF THE INVENTION

A technical problem to be solved by the present invention is to provide a holographic photographing system, a holographic display system, a stereoscopic photographing system and a display method, which can view clear and stereoscopic dynamic images with the naked eyes.

The present invention employs the following technical solutions. A holographic photographing system is provided, including m photographing devices used for photographing an object to be photographed, where m is an integer greater than or equal to 3, wherein the m photographing devices are distributed on a same circumference at equal intervals, and an included angle between every two adjacent photographing devices to a center of circle is 360/m; the m photographing devices are the same in structure and each include an L-shaped frame; at a top end of a vertical portion of the L-shaped frame, there are successively at equal intervals provided with: an intermediate photographing mechanism used for emitting a laser beam to the object to be photographed to generate diffuse reflection spots and photographing the object, and a left photographing mechanism and a right photographing mechanism respectively used for locating the object through the diffuse reflection spots generated on the object by the laser beam emitted by the intermediate photographing mechanism and photographing the object; the diffuse reflection spots generated on the object by the laser beam emitted by the left photographing mechanism and the right photographing mechanism coincide with the diffuse reflection spots generated on the object by the laser beam emitted by the intermediate photographing mechanism; a support plate is provided above a horizontal portion of the L-shaped frame; a left driving mechanism and a right driving mechanism used for driving the left photographing mechanism and the right photographing mechanism to swing left and right are provided at positions, corresponding to the left photographing mechanism and the right photographing mechanism, on an upper surface of the support plate, respectively; a guide post and a vertical driving servo motor are vertically arranged on a horizontal portion of the L-shaped frame; a driving shaft of the vertical driving servo motor is connected to a driving lead screw, and the driving lead screw is connected to the support plate through threads in a penetrated manner; the guide post runs through the support plate; and, the support plate drives the left driving mechanism and the right driving mechanism to move up and down by moving up and down along the guide post under the drive of the driving lead screw, so as to drive the left photographing mechanism or the right photographing mechanism to swing up and down.

The intermediate photographing mechanism includes an intermediate bracket which is fixed at the top end of the vertical portion of the L-shaped frame and used for placing an intermediate camera, and a fixed rod which has an upper end corresponding to the intermediate camera and is hinged with the bracket through a first universal hinge; a lower end of the fixed rod is connected to a manual rotating rod; an intermediate laser pointer is provided at a front end of the manual rotating rod; and, the intermediate camera is located on the same vertical line as the intermediate laser pointer.

The left photographing mechanism and the right photographing mechanism are identical in structure, and each includes: a second universal hinge which is provided above the top end of the vertical portion of the L-shaped frame, and a guide shaft which is horizontally hinged onto the second universal hinge; a side camera and a side laser pointer are provided at an end of the guide shaft through a fixed plate, respectively; the side camera and the side laser pointer are located on a same vertical line, and the side camera is located above the side laser pointer; and, the other end of the guide shaft is connected to a left driving mechanism or a right driving mechanism for driving the guide shaft to drive the side fixed plate, the side camera and the side laser pointer to swing left and right or up and down.

The left driving mechanism or the right driving mechanism is the same in structure and each includes: a nut fixed on the support plate, a bushing which is fixed at an upper end of the nut and used for being inserted into the guide shaft in the left photographing mechanism or the right photographing mechanism in a penetrated manner, and a horizontal driving servo motor fixed on the support plate; a rotating shaft of the horizontal driving servo motor is connected to a horizontal driving lead screw; the horizontal driving lead screw is in threaded connection to the nut; and, the nut drives the bushing to move left and right under the drive of the horizontal driving lead screw, so as to drive the guide shaft in the left photographing mechanism or the right photographing mechanism to swing left and right.

A holographic display system based on a holographic photographing system is provided, including a base and a rotating shaft which is rotatably arranged at a center of the base through a bearing, wherein a circular tray is fixedly supported on the rotating shaft; m displays of a same size are sequentially arranged on an upper surface of the circular tray along a circumference of the circular tray in an end-to-end manner; the m displays form a regular m-face polyhedron; each of the displays corresponds to one photographing device in a holographic photographing system and is used for playing images captured by the corresponding photographing device; an elastic switch used for switching on or off the corresponding display is provided at a position, corresponding to each of the displays, on the circular tray; and, an enabling mechanism used for triggering the elastic switch to enable an angle switch in the display is provided on the base.

The enabling mechanism on the base is: a groove recessed downward is formed on an upper surface of the base facing a viewer, and a transition slope is formed between two sides of the groove and the upper surface of the base.

The elastic switch includes: a spring, a trigger rod which is connected to an upper end of the spring and used for triggering the switch-on or switch-off of the angle switch in the display, and a driving rod which is connected to a lower end of the spring and used for driving the trigger rod; and, a sliding contact capable of sliding on the upper surface of the base as well as the groove and the transition slope formed on the upper surface of the base along with the rotation of the circular tray is provided at a bottom end of the driving rod.

A stereoscopic photographing system based on a holographic photographing system is provided, which is a semi-circular-shape photographing mechanism composed of n layers of holographic photographing systems arranged from top to bottom, wherein the first layer of the holographic photographing system is provided with one photographing device, and each of the remaining layers thereof is provided with m photographing devices, where m=3×(n−1); the m photographing devices are distributed on a same circumference at equal intervals, an included angle between every two adjacent photographing devices to a center of the circle is 360/m, and the m photographing devices are the same in structure; and, the object to be photographed is located in the semicircular photographing mechanism.

A display method for a holographic display system based on a holographic photographing system is provided, wherein m displays of a same size are sequentially arranged along a circumference of the circular tray in an end-to-end manner; the m displays form a regular m-face polyhedron; when m is large enough, faces of the m-face polyhedron become a surface of a cylinder, and a plane is formed at a local position, so that the regular m-face polyhedron forms a display; and, during playback, instead of driving the tray to rotate so as to realize page turning, by operating left and right direction keys on a screen of a single display or sliding a finger slide left and right on a touch screen, the played image can be switched over.

By adopting the holographic photographing system, the holographic display system, the stereoscopic photographing system and the display method of the present invention, a viewer can view a same moving object at any instant and at any angle at will. Moreover, the 3D effects of the played pictures can be viewed by the naked eyes. Particularly, the depth information of the object at any angle can be experienced. Therefore, by this omnidirectional and full-view technology, the stereoscopic effect of imaging is higher, and the images are more realistic. By this method, omnidirectional images with stereoscopic information of a moving object at any instant and at any angle of view (i.e., upper, lower, left, right, front and rear) can be really photographed. Consequently, a viewer can get a real experience like viewing the real object in reality, and be personally on the scene.

BRIEF DESCRIPTION OF THE DRAWINGS

FIG. 5 is a sectional view of FIG. 3 taken along line B-B;

FIG. 11 is a schematic diagram of the overall structure of a stereoscopic photographing system according to the present invention, in which:

| | |
|---|---|
| A: photographing device | B: display |
| 1: L-shaped frame | 1a: vertical portion |
| 1b: horizontal portion | 2: left photographing mechanism |
| 3: intermediate photographing mechanism | 31: intermediate camera |
| 32: bracket | 33: first universal hinge |
| 34: fixed rod | 35: manual rotating rod |
| 36: intermediate laser pointer | 4: right photographing mechanism |
| 5: guide post | 6: support plate |
| 61: screw hole | 7: driving lead screw |
| 8: vertical driving servo motor | 9: left driving mechanism |
| 10: right driving mechanism | 101: bracket |
| 102: second universal hinge | 103: guide shaft |
| 104: side camera | 105: fixed plate |
| 106: side laser pointer | 201: nut |
| 202: bushing | 203: horizontal driving servo motor |
| 204: horizontal driving lead screw | 300: frame |
| 301: left camera | 302: right camera |
| 20: base | 21: rotating shaft |
| 22: elastic switch | 221: trigger rod |
| 222: spring | 223: driving rod |

| | |
|---|---|
| 224: sliding contact | 23: tray |
| 24: enabling mechanism | 241: groove |
| 242: transition slope | |

DETAILED DESCRIPTION OF THE INVENTION

The holographic photographing system, the holographic display device, the stereoscopic photographing system and the display method of the present invention will be described below in detail by embodiments with reference to the accompanying drawings.

A real stereoscopic scene is simultaneously photographed from various angles of view by a 3D method, and the images from the angles of view are simultaneously played by a 3D method. Consequently, a viewer can view an object by selectively switching over the images at any angle of view, and can fully obtain the appearance and information of the object at each angle.

In the holographic photographing system and the holographic display system of the present invention, m cameras are arranged around a same moving object, and the object is simultaneously tracked and photographed from various angles by the m cameras. During playback, a viewer switches the screen to the corresponding camera by switching on/off the switch so as to watch the object by the images from the required angle. Therefore, the viewer can view the same moving object at any instant and at any angle at will. Moreover, the 3D effects of the played pictures can be viewed by the naked eyes. Particularly, the depth information of the object at any angle can be experienced. Therefore, by this omnidirectional and full-view technology, the stereoscopic effect of imaging is higher, and the images are more realistic. By this method, omnidirectional images with stereoscopic information of a moving object at any instant and at any angle of view (i.e., upper, lower, left, right, front and rear) can be really photographed. Consequently, the viewer can get a real experience like viewing the real object in reality.

Figure 2:
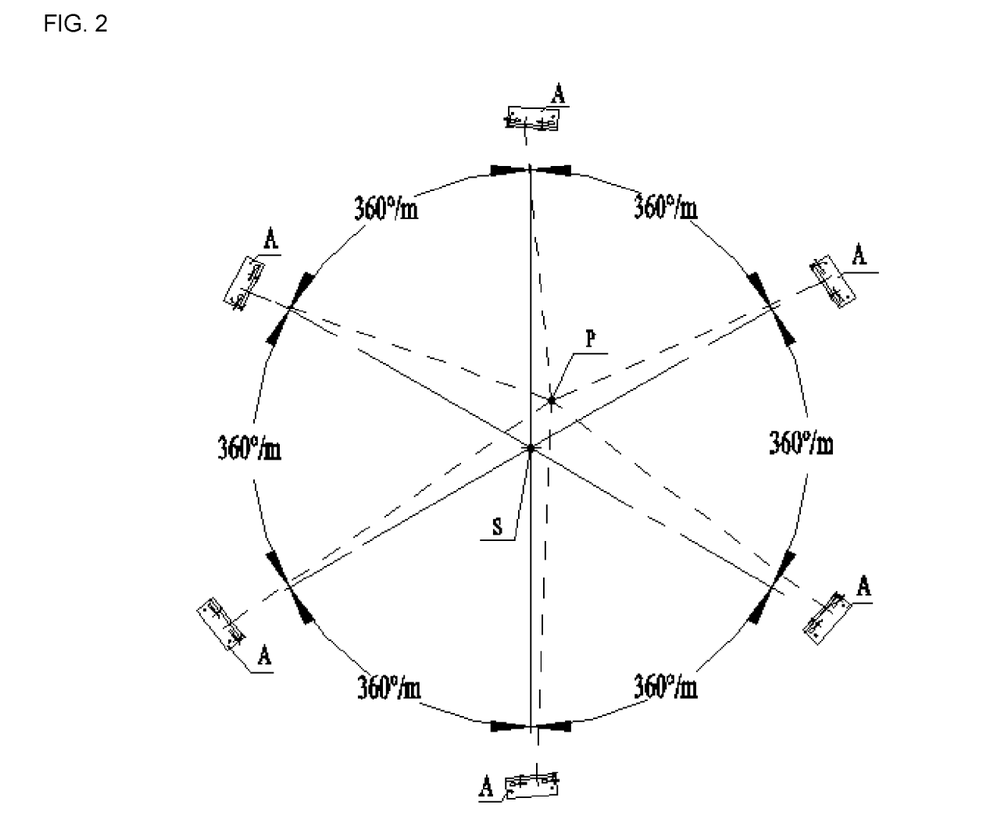
FIG. 2 is a schematic diagram of the overall layout of a photographic photographing system according to the present invention.
Figure 3:
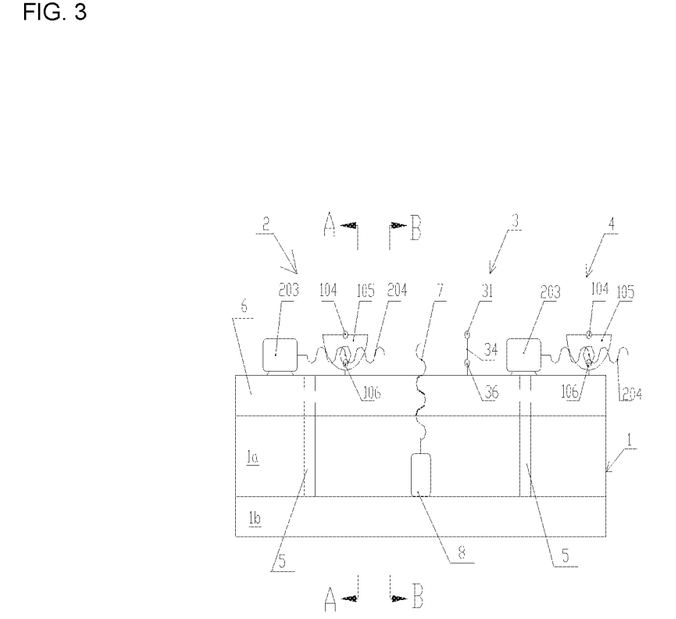
FIG. 3 is a schematic diagram of the overall structure of a photographing device according to the present invention.
Figure 4:
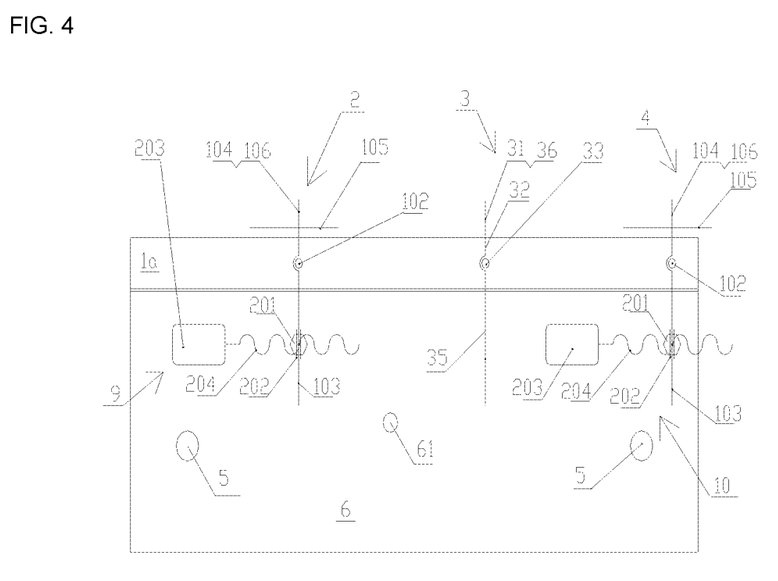
FIG. 4 is a top view of FIG. 3.

As shown in FIG. 2, the holographic photographing system of the present invention includes m photographing devices A used for photographing an object P, where m is an integer greater than or equal to 3. The m photographing devices A are at equal intervals distributed on a same circumference having a center of circle S. An included angle between every two adjacent photographing devices A to the center of circle is 360/m, and the m photographing devices A are the same in structure. As shown in FIGS. 3 and 4, each of the photographing devices A in the present invention includes an L-shaped frame 1. At a top end of a vertical portion 1a of the L-shaped frame 1, there are successively at equal intervals provided with: an intermediate photographing mechanism 3 used for emitting a laser beam to the object P to generate diffuse reflection spots and photographing the object P, and a left photographing mechanism 2 and a right photographing mechanism 4 respectively used for locating the object through the diffuse reflection spots generated on the object by the laser beam emitted by the intermediate photographing mechanism 3 and photographing the object, the diffuse reflection spots generated on the object by the laser beam emitted by the left photographing mechanism and the right photographing mechanism coincide with the diffuse reflection spots generated on the object by the laser beam emitted by the intermediate photographing mechanism. A support plate 6 is provided above a horizontal portion 1b of the L-shaped frame 1. A left driving mechanism 9 and a right driving mechanism 10 used for driving the left photographing mechanism 2 and the right photographing mechanism 4 to swing left and right are provided at positions, corresponding to the left photographing mechanism 2 and the right photographing mechanism 4, on an upper surface of the support plate 6, respectively. A guide post 5 and a vertical driving servo motor 8 are vertically arranged on a horizontal portion 1b of the L-shaped frame 1. A driving shaft of the vertical driving servo motor 8 is connected to a driving lead screw 7, and the driving lead screw 7 is connected to the support plate 6 through a screw hole 61 in a penetrated manner. The guide post 5 runs through the support plate 6. The support plate 6 drives the left driving mechanism 9 and the right driving mechanism 10 to move up and down by moving up and down along the guide post 5 under the drive of the driving lead screw 7, so that the left driving mechanism 9 and the right driving mechanism 10 move up and down to drive a guide shaft 103 in the left photographing mechanism 2 or the right photographing mechanism 4 to swing up and down.

Figure 6:
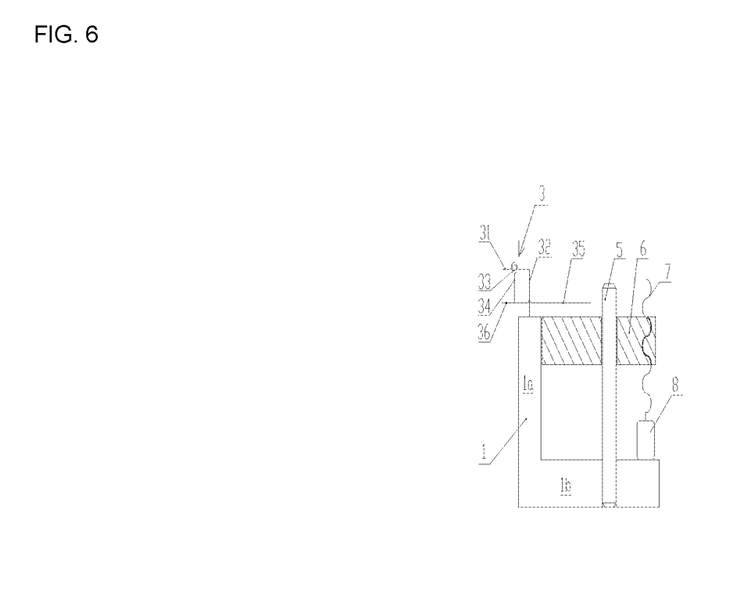
Figure 7:
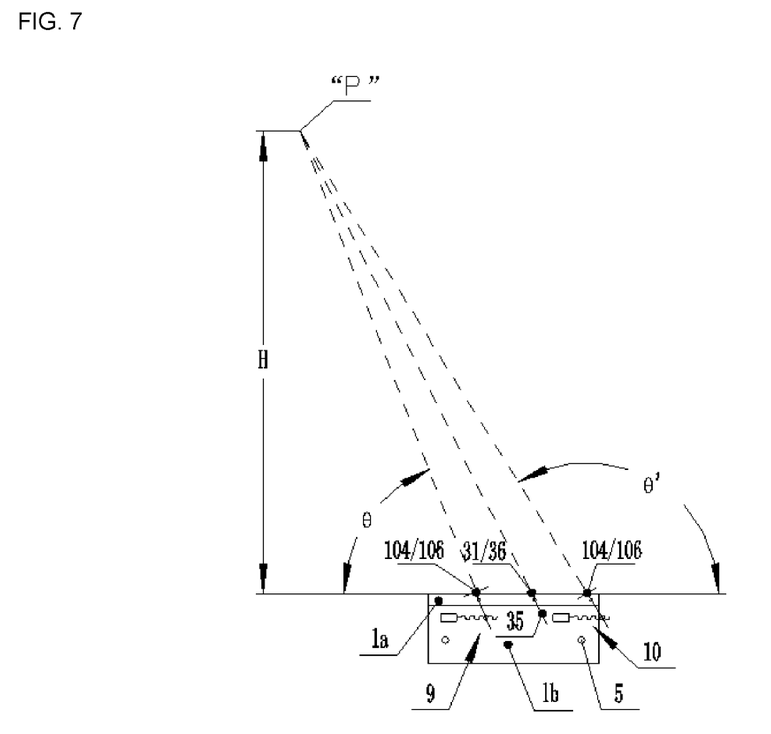
FIG. 7 is a schematic diagram of photographing of each photographing device according to the present invention.

As shown in FIGS. 3, 4 and 6, the intermediate photographing mechanism 3 includes an intermediate bracket 32 which is fixed at the top end of the vertical portion 1a of the L-shaped frame 1 and used for placing an intermediate camera 31, and a fixed rod 34 which has an upper end corresponding to the intermediate camera 31 and is hinged with the bracket 32 through a first universal hinge 33. A lower end of the fixed rod 34 is connected to a manual rotating rod 35. An intermediate laser pointer 36 is provided at a front end of the manual rotating rod 35. The intermediate camera 31 is located on the same vertical line as the intermediate laser pointer 36.

Figure 5:
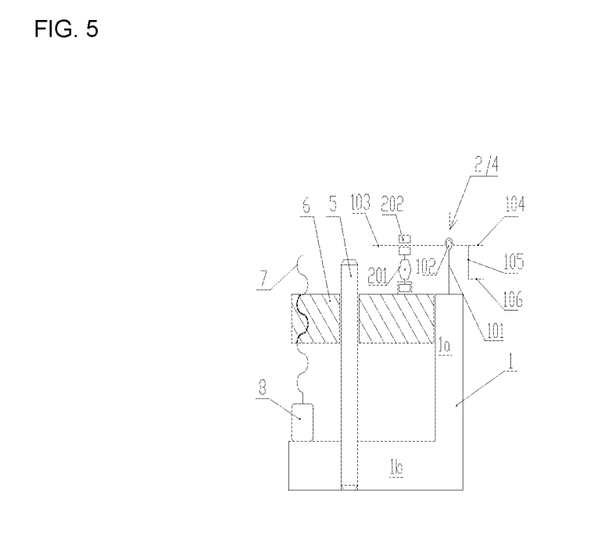
FIG. 5 is a sectional view of FIG. 3 taken along line A-A.

As shown in FIGS. 3 and 5, the left photographing mechanism 2 and the right photographing mechanism 4 are as same in structure, and each includes: a second universal hinge 102 which is provided above the top end of the vertical portion 1a of the L-shaped frame 1, and a guide shaft 103 which is horizontally hinged onto the second universal hinge 102. A side camera 104 and a side laser pointer 106 are provided at an end of the guide shaft 103 through a fixed plate 105, respectively. Both the side cameras 104 and the side laser pointers 106 are mounted on the same fixed plate 105 and located on a same vertical line, and the side cameras 104 are located above the side laser pointers 106. The other end of the guide shaft 103 is connected to a left driving mechanism 9 or a right driving mechanism 10 for driving the guide shaft 103 to drive the side fixed plate 105, the side cameras 104 and the side laser pointers 106 to swing left and right or up and down.

As shown in FIGS. 3 and 5, the left driving mechanism 9 or the right driving mechanism 10 is the same in structure and each includes: a nut 201 fixed on the support plate 6, a bushing 202 which is fixed at an upper end of the nut 201 and used for being inserted into the guide shaft 103 in the left photographing mechanism 2 or the right photographing mechanism 4 in a penetrated manner, and a horizontal driving servo motor 203 fixed on the support plate 6. A rotating shaft of the horizontal driving servo motor 203 is connected to a horizontal driving lead screw 204, and the horizontal driving lead screw 204 is in threaded connection to the nut 201. The nut 201 drives the bushing 202 to move left and right under the drive of the horizontal driving lead screw 204, so as to drive the guide shaft 103 in the left photographing mechanism 2 or the right photographing mechanism 4 to swing left and right.

Figure 8:
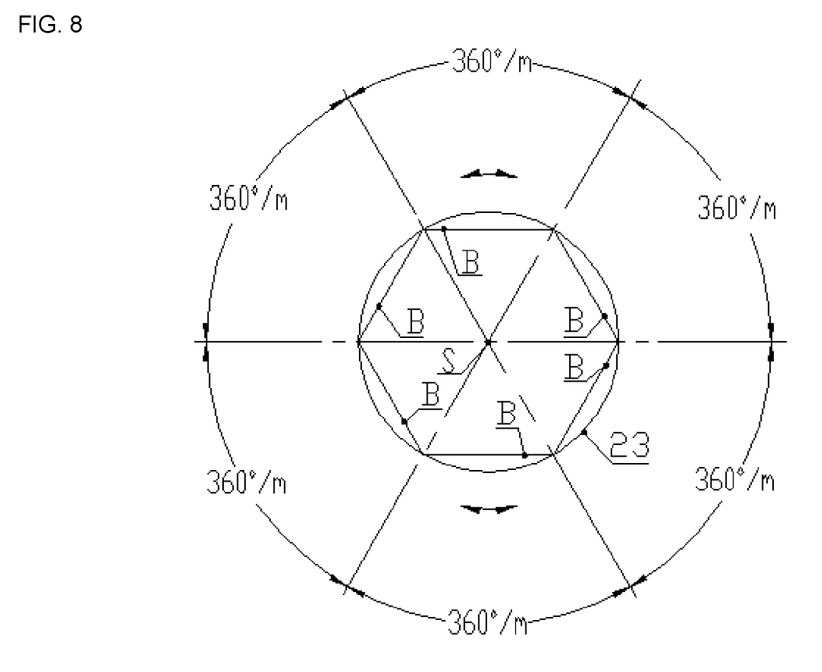
FIG. 8 is a top view of the layout of a holographic display system according to the present invention.
Figure 9:
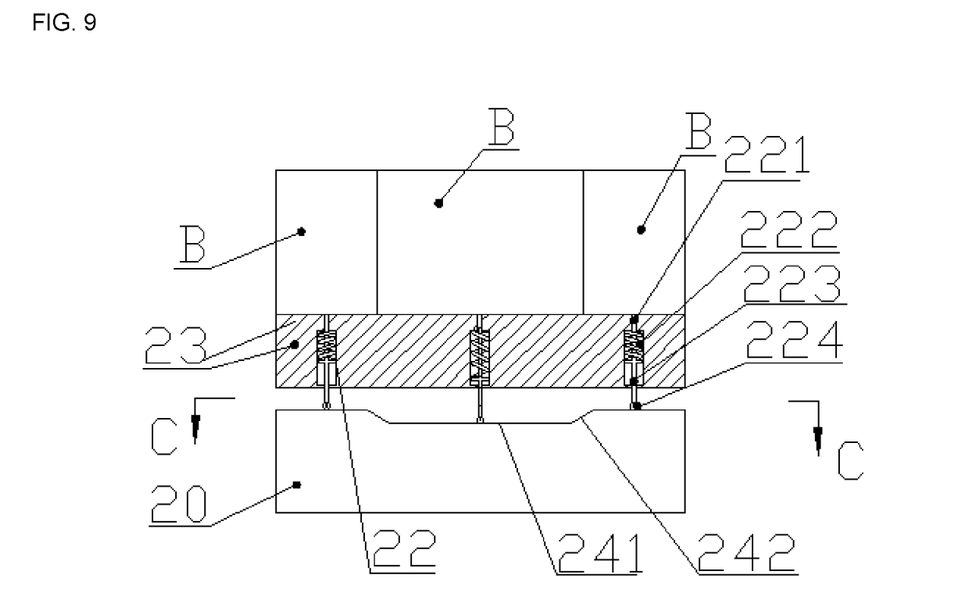
FIG. 9 is a bottom view of FIG. 8.

As shown in FIGS. 8 and 9, the holographic display system based on a holographic photographing system of the present invention includes a base 20 and a rotating shaft 21 which is rotatably arranged at a center of the base 20 through a bearing. A circular tray 23 is fixedly supported on the rotating shaft 21. M displays B of a same size are sequentially arranged on an upper surface of the circular tray 23 along a circumference of the circular tray 23 in an end-to-end manner. The m displays B form a regular m-face polyhedron. Each of the displays B corresponds to one photographing device A in a holographic photographing system and is used for playing images captured by the corresponding photographing device A. An elastic switch 22 used for switching on or off the corresponding display B is provided at a position, corresponding to each of the displays B, on the circular tray 23. An enabling mechanism 24 used for triggering the elastic switch 22 to enable an angle switch in the display B is formed on the base 20.

Figure 10:
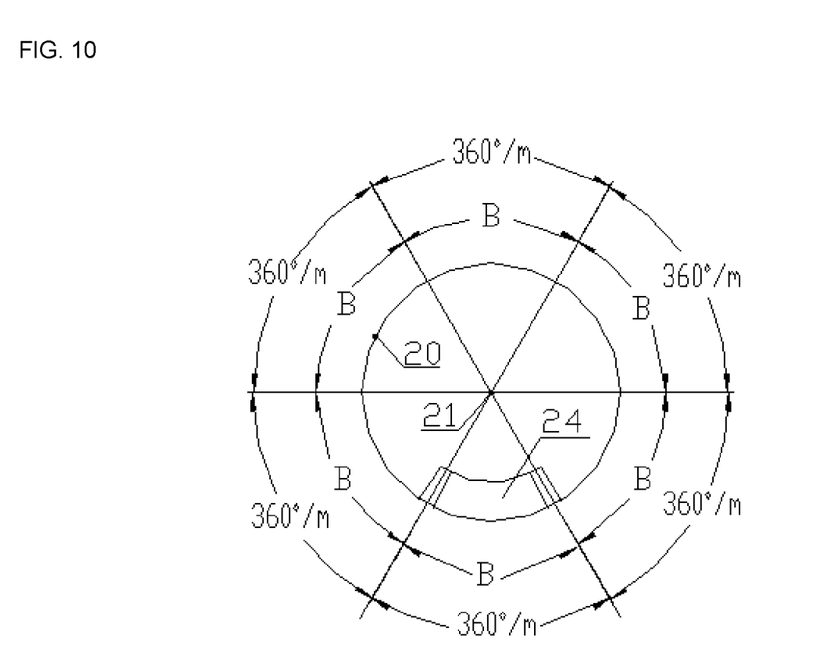
FIG. 10 is a view of FIG. 9 in a direction C-C.

As shown in FIGS. 9 and 10, the enabling mechanism 24 formed on the base 20 is: a groove 241 recessed downward is formed on an upper surface of the base 20 facing a viewer, and a transition slope 242 is formed between two sides of the groove 241 and the upper surface of the base 20.

As shown in FIG. 9, the elastic switch 22 includes: a spring 222, a trigger rod 221 which is connected to an upper end of the spring 222 and used for triggering the switch-on or switch-off of the angle switch in the display B, and a driving rod 223 which is connected to a lower end of the spring 222 and used for driving the trigger rod 221 to act. A sliding contact 24 is capable of sliding on the upper surface of the base 20 as well as the groove 231 and the transition slope 232 formed on the upper surface of the base 20 along with the rotation of the circular tray 21 is provided at a bottom end of the driving rod 223.

In the holographic display system based on a holographic photographing system of the present invention, if the viewer views at a position corresponding to the enabling mechanism 24 on the base 20 (as shown in FIG. 10), the display in a (360°/m) range of the enabling mechanism only plays the images photographed by the corresponding photographing device, and all the displays beyond the range of the enabling mechanism are switched off. This is because when the display is rotated to the position of the enabling mechanism, the elastic switch 22 of the display slides into the groove 241 of the enabling mechanism, and the remaining displays are switched off, so that only this display plays the images. If the viewer wants to the images taken by specific photographing device, the viewer only needs to rotate the display corresponding to this photographing device to the position of the enabling mechanism 24 by rotating the tray 23, so that the switch on this display is switched on and this display starts playing the images. As the rotation angle and position range of the tray 23 changes continuously, the display at the corresponding angle is switched on, and the images are also changed. It can be seen that, at any instant, only the unique image shot by the photographing device corresponding to the display within the position range of the viewer is played, and the images shot by the photographing devices corresponding to other displays are switched off during playing.

It can be known from FIG. 2 that the diffuse reflection spot projected on the object formed by the laser pointer can be replaced by a spotted light source P wore on the object as a search target. Then, the L-shaped frames 1 of the m (m≥3) photographing devices (as shown in FIG. 3) are roughly fixed and uniformly arranged around the spotted light source P. Since each photographing device is capable of automatically tracking the target, but the existing cameras cannot be realized, the angle relative to the object is not strictly required. Therefore, during the entire photographing period, the object and the spotted light source P on its surface can be moved arbitrarily within the range enclosed by the arranged m photographing devices A without influencing the photographing effect, so that the operability is higher. No matter how many photographing devices participate in photographing, the following features must be available:

1. Same object P must be simultaneously tracked for photographing (as shown in FIG. 4) by the photographing devices. Since each photographing device has the ability to automatically capture and track the photographing target specified by a photographer, it is not difficult to simultaneously photograph the same object.

2. Since the transmission rate of electrical signals is 300,000 km/s, regardless of the number of photographing devices or the spacing between the photographing devices, the simultaneous and synchronous photographing can be realized as long as the communication channels for operation signals of the photographing devices are connected in parallel (although the leads connecting the photographing devices are different in length); and similarly, the simultaneous and synchronous playback can be realized.

3. Instantaneous images photographed by all the photographing devices, as well as the one-to-one correspondence between the images and the time, are recorded by a computer. It can also be known from FIGS. 3 and 4 that, in each instantaneous image photographed in a state where the L-shaped frame 1 of each photographing device remains stationary, the object P can be automatically positioned in a corresponding 'plane e'. Therefore, at any instant, all the 'plane e's are intersected at the object P. During playback, the 'plane e' is a display screen. This is the holographic photographing technology and playback technology according to the present invention. The photographing process is seems that a circle of viewers stare at a same object simultaneously; and, during playback, the viewers can select an expected angle of view to watch the movie.

During playback, each 'plane' is a screen for display respective clear images. Therefore, if the m photographing devices are uniformly arranged around the object at 360° in these 'planes' (as shown in FIG. 2), there must be m 'planes', and there also must be m displays (as shown by B in FIG. 8) during playback. If the m displays B (as shown in FIG. 8) are successively connected in an end-to-end manner to form a polyhedron, each side face of the polyhedron represents the corresponding 'plane', which is a display during playback. Said screen may be a display screen of a TV set or a display screen of a computer, or may also be a display screen of a mobile phone or a tablet computer. During playback, if a viewer is within the angle range displayed by the display, only the images photographed by the photographing device in this range during photographing are played, and any image photographed by the photographing devices at all other positions are not shown. When the viewer rotates the tray, this display leaves the enabling mechanism 24 on the base 20 and is immediately switched off, and another display is then positioned at the enabling mechanism 24 on the base 20, so that this display plays back the images photographed by the corresponding photographing device.

The image switchover process is completed by triggering the angle switch on the display through the elastic switch 22 shown in FIG. 9. The base 20 keeps stationary, and the viewer manually rotates the tray 23 about the center of circle S to select an image of interest. When the driving rod 223 of the elastic switch 22 in FIG. 9 is located at a high position, the circuit of the corresponding display is switched off. When the driving rod 223 of the elastic switch 22 is located in the groove 241 of the base 20, the circuit of the corresponding display is switched on. It can be known that only the display in the angle range facing the viewer plays back the images and other displays are switched off. When the tray 23 is rotated again, only when the display facing the viewer is located in the groove 242 of the base 20, this display performs playback, and all the other displays are switched off. Whether the tray 23 is to rotate forward or reverse, fast or slow, there is always one display is in the range of the groove 241 of the base 20, in which case only the display within this range is switched to the playback screen, and the other displays are switched off. The played image is exactly the image photographed by the corresponding photographing device during photographing.

Figure 11:
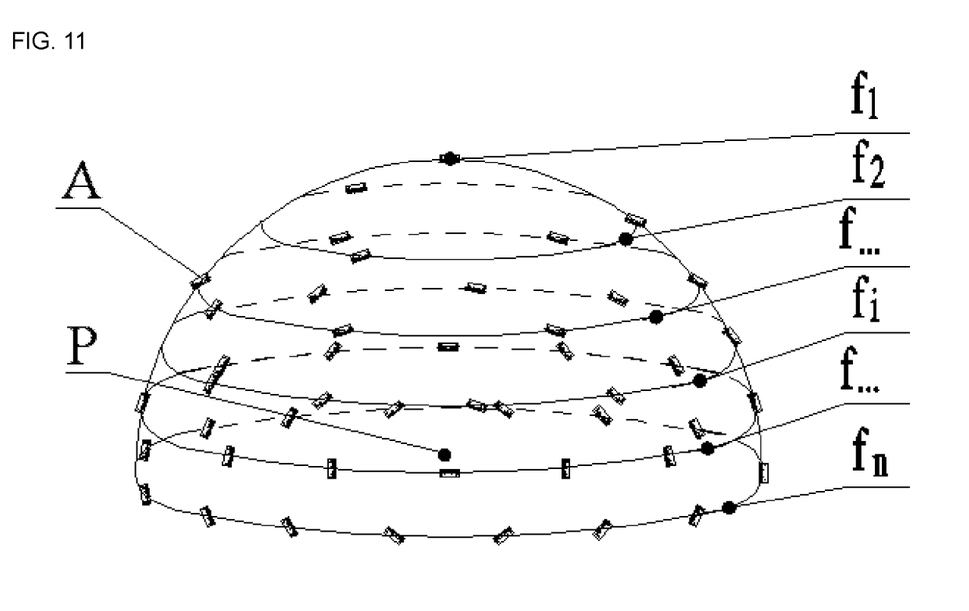

Based on the holographic photographing system of the present invention, a stereoscopic photographing system is shown in FIG. 11. As shown in FIG. 11, the stereoscopic photographing system based on the holographic photographing system of the present invention is a semicircular photographing mechanism composed of n layers of holographic photographing systems arranged from top to bottom, wherein the object holographic photographing system f1 in the first layer is provided with one photographing device A, and the holographic photographing system f2, fi, . . . , fn in each of the remaining layers is provided with m photographing devices A, where m=3×(n−1). The m photographing devices A are distributed on a same circumference at equal intervals, an included angle between every two adjacent photographing devices A to a center of the circle is 360/m, and the m photographing devices A are the same in structure. The object P is located in the semicircular photographing mechanism.

The present invention provides a display method for a holographic display system based on a holographic photographing system, wherein m displays B of a same size are circumferentially arranged sequentially in an end-to-end manner. The m displays B form a regular m-face polyhedron. When the number m is large enough, faces of the m-face polyhedron become a surface of a cylinder, and a plane is formed at a local position, so that the regular m-face polyhedron forms a display. During playback, instead of driving the tray 23 to rotate, by operating left and right direction keys on a screen of a single display to realize page switching or making a finger slide left and right on a touch screen to realize page switching, playing images can be switched over.

The display method for a holographic display system based on a holographic photographing system in the present invention can be implemented on a screen of a TV set, a display of a computer, a screen of a mobile phone or a screen of a tablet computer, and the page switching can be realized by sliding the touch screen up and down or left and right or operating direction keys. The holographic display technology of the present invention can be described as follows: when a circle of viewers stare at a same object simultaneously, it is expected that the object can be viewed from any viewer's angle, and the viewed image has a 3D effect. The switching effect is related to the number of the photographing devices A and the displays B, and the number of the photographing devices A must be equal to the number of the displays B. When the switchover (page switching) is performed in a case where the number of photographing devices A and displays is small, the angle of change is large, and it seems that the pictures jump or even change suddenly; but if the number is larger, the switching effect (page switching) is better.

When the number is large enough, the images are continuous during switchover (page switching), and the viewer has an immersive experience when viewing the images. At this time, the faces of the regular m-face polyhedron in FIGS. 8, 9 and 10 become a surface of a cylinder. If the diameter of the cylinder is large enough, the surface can be regarded as a plane at a local position and thus become a display E. In accordance with this principle, during playback, instead of driving the tray 23 to rotate to realize paging switching, by operating left and right direction keys on a screen of a single display or sliding a finger left and right on a touch screen of a mobile phone, the played image can be switched over. It is also possible that the screen of the TV set or the screen of the mobile phone is made into a cylindrical surface, instead of rotating the tray 3 to realize page switching, by rotating the cylindrical surface about an axis, the complete and clear 3D holographic image can be viewed. If the object and m photographing devices described above are located in one plane, the viewer can only view from a horizontal angle of view, and the effect of viewing from a high position cannot be realized. If n equidistant planes fi are arranged above a plane fn in the way shown in FIG. 11, m photographing devices arranged uniformly are arranged around the object in each plane fi. Except that one photographing device n=1 is arranged in the highest layer f1 as a vertex, the rule of the number of photographing devices arranged in each of the remaining layers fi from top to down is as follows: m=3×(n−1) (as shown in FIG. 11). In this way, during playback, page switching can be realized left and right or up and down, so that the viewer can view the image from a top angle of view. In accordance with this principle, the screen of the TV set or the screen of the mobile phone may also be made of a spherical surface; and, instead of the page switching, by rotating the spherical surface about a center of sphere, the complete and clear 3D photographic image played on the spherical screen can be viewed from top, bottom, left and right angles of view.

The invention claimed is:

1. A holographic photographing system, comprising
m photographing devices (A) used for photographing an object (P), where m is an integer greater than or equal to 3;
the m photographing devices (A) being distributed on a same circumference at equal intervals,
an included angle between every two adjacent photographing devices (A) to a center of circle is 360/m;
the m photographing devices (A) being the same in structure, and each comprising an L-shaped frame (1);
a top end of a vertical portion (1a) of the L-shaped frame (1) providing with the following mechanisms successively at equal intervals:
an intermediate photographing mechanism (3) used for emitting a laser beam to the object (P) to generate diffuse reflection spots and photographing the object (P),
a left photographing mechanism (2) and a right photographing mechanism (4) separately used for locating the object (P) through the diffuse reflection spots generated on the object (P) by the laser beam emitted by the intermediate photographing mechanism (3) and photographing the object (P);
the diffuse reflection spots generated on the object by the laser beam emitted by the left photographing mechanism (2) and the right photographing mechanism (4) coinciding with the diffuse reflection spots generated on the object (P) by the laser beam emitted by the intermediate photographing mechanism (3);

a support plate (6) being provided above a horizontal portion (1b) of the L-shaped frame (1);

a left driving mechanism (9) and a right driving mechanism (10) used for driving the left photographing mechanism (2) and the right photographing mechanism (4) to swing left and right are provided at positions, corresponding to the left photographing mechanism (2) and the right photographing mechanism (4), on an upper surface of the support plate (6), respectively;

a guide post (5) and a vertical driving servo motor (8) are vertically arranged on a horizontal portion (1b) of the L-shaped frame (1);

a driving shaft of the vertical driving servo motor (8) is connected to a driving lead screw (7), and the driving lead screw (7) is connected to the support plate (6) through threads in a penetrated manner;

the guide post (5) running through the support plate (6); and, the support plate (6) driving the left driving mechanism (9) and the right driving mechanism (10) to move up and down by moving up and down along the guide post (5) under the drive of the driving lead screw (7), so as to drive the left photographing mechanism (2) or the right photographing mechanism (4) to swing up and down.

2. The holographic photographing system according to claim 1, wherein the intermediate photographing mechanism (3) comprises an intermediate bracket (32) which is fixed at the top end of the vertical portion (1a) of the L-shaped frame (1) and used for placing an intermediate camera (31), and a fixed rod (34) which has an upper end corresponding to the intermediate camera (31) and is hinged with the bracket (32) through a first universal hinge (33); a lower end of the fixed rod (34) is connected to a manual rotating rod (35); an intermediate laser pointer (36) is provided at a front end of the manual rotating rod (35); and, the intermediate camera (31) is located on the same vertical line as the intermediate laser pointer (36).

3. The holographic photographing system according to claim 1, wherein the left photographing mechanism (2) and the right photographing mechanism (4) are the same in structure, and each comprises: a second universal hinge (102) which is provided above the top end of the vertical portion (1a) of the L-shaped frame (1), and a guide shaft (103) which is horizontally hinged onto the second universal hinge (102); a side camera (104) and a side laser pointer (106) are provided at an end of the guide shaft (103) through a fixed plate (105), respectively; the side camera (104) and the side laser pointer (106) are located on a same vertical line, and the side camera (104) is located above the side laser pointer (106); and, the other end of the guide shaft (103) is connected to a left driving mechanism (9) or a right driving mechanism (10) for driving the guide shaft (103) to drive the side fixed plate (105), the side cameras (104) and the side laser pointers (106) to swing left and right or up and down.

4. The holographic photographing system according to claim 1, wherein the left driving mechanism (9) or the right driving mechanism (10) is the same in structure and each comprises: a nut (201) fixed on the support plate (6), a bushing (202) which is fixed at an upper end of the nut (201) and is used for being inserted into the guide shaft (103) in the left photographing mechanism (2) or the right photographing mechanism (4) in a penetrated manner, and a horizontal driving servo motor (203) fixed on the support plate (6); a rotating shaft of the horizontal driving servo motor (203) is connected to a horizontal driving lead screw (204); the horizontal driving lead screw (204) is in threaded connection to the nut (201); and, the nut (201) drives the bushing (202) to move left and right under the drive of the horizontal driving lead screw (204), so as to drive the guide shaft (103) in the left photographing mechanism (2) or the right photographing mechanism (4) to swing left and right.

5. A holographic display system based on the holographic photographing system according to claim 1, comprising a base (20) and a rotating shaft (21) that is rotatably arranged at a center of the base (20) through a bearing; a circular tray (23) is fixedly supported on the rotating shaft (21); m displays (B) of a same size are sequentially arranged on an upper surface of the circular tray (23) along a circumference of the circular tray (23) in an end-to-end manner; the m displays (B) form a regular m-face polyhedron; each of the displays (B) corresponds to one photographing device (A) in an object holographic photographing system and is used for showing images captured by the corresponding photographing device (A); an elastic switch (22) used for switching on or off the corresponding display (B) is provided at a position, corresponding to each of the displays (B), on the circular tray (23); and, an enabling mechanism (24) used for triggering the elastic switch (22) to enable an angle switch in the display (B) is formed on the base (20).

6. The holographic display system based on a holographic photographing system according to claim 5, wherein the enabling mechanism (24) formed on the base (20) comprises: a groove (241) recessed downward is formed on an upper surface of the base (20) facing a viewer, and a transition slope (242) is formed between two sides of the groove (241) and the upper surface of the base (20).

7. The holographic display system based on a holographic photographing system according to claim 5, wherein the elastic switch (22) comprises: a spring (222), a trigger rod (221) which is connected to an upper end of the spring (222) and used for triggering the switch-on or switch-off of the angle switch in the display (B), and a driving rod (223) which is connected to a lower end of the spring (222) and is used for driving the trigger rod (221); and, a sliding contact (24) capable of sliding on the upper surface of the base (20) as well as the groove (231) and the transition slope (232) formed on the upper surface of the base (20) along with the rotation of the circular tray (21) is provided at a bottom end of the driving rod (223).

8. A stereoscopic photographing system based on the holographic photographing system according to claim 1, wherein the stereoscopic photographing system is a semicircular-shape photographing mechanism composed of n layers of holographic photographing systems arranged from top to bottom, wherein the first layer (f1) of the holographic photographing system is provided with one photographing device (A), and each of the remaining layers (f2, ..., fi, ..., fn) thereof is provided with m photographing devices (A), where m=3×(n−1); the m photographing devices (A) are distributed on a same circumference at equal intervals, an included angle between every two adjacent photographing devices (A) to a center of the circle is 360/m, and the m photographing devices (A) are the same in structure; and, the object (P) is located in the semicircular photographing mechanism.

9. A display method for a holographic display system based on the holographic photographing system according to claim 1, wherein m displays (B) of a same size are sequentially arranged along a circumference of the circular tray in an end-to-end manner; the m displays (B) form a regular m-face polyhedron; when m is large enough, faces of the m-face polyhedron become a surface of a cylinder, and a plane is formed at a local position, so that the regular m-face polyhedron forms a display; and, during playback, instead of driving the tray (23) to rotate to realize page switching, by operating left and right direction keys on a screen of a single display or sliding a finger slide left and right on a touch screen, the played image can be switched over.

\* \* \* \* \*